US011083983B2

United States Patent
Kruse et al.

(10) Patent No.: US 11,083,983 B2
(45) Date of Patent: Aug. 10, 2021

(54) FLOW-DIVERGER FEED INLET DISTRIBUTOR

(71) Applicant: Bechtel Oil, Gas and Chemicals, Inc., Houston, TX (US)

(72) Inventors: Charles Joseph Kruse, Cypress, TX (US); Qui Truong Poorman, Katy, TX (US); Reni Raju, League City, TX (US)

(73) Assignee: BECHTEL OIL, GAS AND CHEMICALS, INC, Houston, TX (US)

( * ) Notice: Subject to any disclaimer, the term of this patent is extended or adjusted under 35 U.S.C. 154(b) by 0 days.

(21) Appl. No.: 16/759,146

(22) PCT Filed: Aug. 29, 2019

(86) PCT No.: PCT/US2019/048747
§ 371 (c)(1),
(2) Date: Apr. 24, 2020

(87) PCT Pub. No.: WO2020/047214
PCT Pub. Date: Mar. 5, 2020

(65) Prior Publication Data
US 2020/0338477 A1    Oct. 29, 2020

Related U.S. Application Data

(60) Provisional application No. 62/724,486, filed on Aug. 29, 2018.

(51) Int. Cl.
*B01D 19/00*    (2006.01)
*F15D 1/00*    (2006.01)

(52) U.S. Cl.
CPC ....... *B01D 19/0042* (2013.01); *F15D 1/0005* (2013.01)

(58) Field of Classification Search
None
See application file for complete search history.

(56) References Cited

U.S. PATENT DOCUMENTS 3,520,116 A    12/1968 Good
4,591,367 A    5/1986 Pek et al.
(Continued)

FOREIGN PATENT DOCUMENTS

GB    1119699 A    7/1968

OTHER PUBLICATIONS

Young, Lee, International Search Report and Written Opinion for PCT App. No. PCT/US19/48747, dated Dec. 4, 2019, 7 pages, USPTO, Alexandria, Va.

(Continued)

*Primary Examiner* — Christopher P Jones
*Assistant Examiner* — Phillip Y Shao
(74) *Attorney, Agent, or Firm* — Crain, Caton and James (57) ABSTRACT

A flow-diverger feed inlet distributor and/or a vertical, partially perforated baffle for separating vapor and liquid in a horizontal vessel. The flow-diverger feed inlet distributor comprises multiple pairs of straight-vertical vanes positioned in the horizontal vessel adjacent a feed inlet opening at one head/end of the vessel. The partially perforated baffle is positioned in the vessel adjacent the feed inlet opening.

12 Claims, 11 Drawing Sheets

(56) References Cited

U.S. PATENT DOCUMENTS

| | | | |
|---|---|---|---|
| 6,183,541 B1 | 2/2001 | Compton | |
| 6,537,458 B1* | 3/2003 | Polderman | B01D 17/00 |
| | | | 210/801 |
| 8,070,141 B2 | 12/2011 | Kooijman et al. | |
| 8,470,080 B1* | 6/2013 | Ball, IV | B01D 21/2405 |
| | | | 95/253 |
| 8,627,848 B2* | 1/2014 | Bambara | B01D 19/0042 |
| | | | 137/561 A |
| 2017/0227268 A1* | 8/2017 | Harrison | F16N 31/02 |

OTHER PUBLICATIONS

Guillaume White-Rolland, Office Action, Canadian Patent Application No. 3081098, dated Aug. 11, 2020, 5 pages, Canadian Intellectual Property Office, Canada.

Robert K Feutlinske, Response to Office Action, Canadian Patent Application No. 3081098, dated Aug. 28, 2020, 24 pages, Kirby Eades Gale Baker, Canada.

Pedro Marti, Examination Report, European Patent Application No. 19855941.1, dated Sep. 11, 2020, 4 pages, European Patent Office, European Patent Office, Munich Germany.

Pedro Marti, Examination Report. European Patent Application No. 19855941.1. dated Jan. 21, 2021, 6 pages, European Patent Office, Munich Germany.

Guillaume White-Roland, Examination Report, Canadian Patent Application No. 3081098, Nov. 3, 2020, 3 pages, Canadian Intellectual Property Office, Canada.

Robert K Feutlinske, Response to Examination Report, Canadian Patent Application No. 3081098, Dec. 3, 2020, 11 pages, Kirby Eades Gale Baker, Canada.

* cited by examiner

FLOW-DIVERGER FEED INLET DISTRIBUTOR

CROSS-REFERENCE TO RELATED APPLICATIONS

This application is a U.S. National Stage Application of PCT Patent Application Ser. No. PCT/US19/48747, filed Aug. 29, 2019, which claims the priority of U.S. Provisional Patent Application No. 62/724,486, filed Aug. 29, 2018, both of which are incorporated herein by reference.

FIELD OF THE DISCLOSURE

The following disclosure generally relates to a flow-diverger feed inlet distributor for a horizontal vessel and methods of use. More particularly, the following disclosure relates to a flow-diverger feed inlet distributor comprising multiple pairs of straight-vertical vanes and/or a vertical, partially perforated, baffle for the horizontal vessel.

BACKGROUND

A 3-phase separator is a horizontal vessel designed to provide liquid holdup, and sufficient vertical spacing and travel length to enable good vapor-liquid and liquid-liquid separation. The feed inlet distributor on the vessel is designed to facilitate phase separations through reasonably uniform velocity profiles for vapor in the vessel vapor space and for liquid in the vessel liquid space, as the vapor and liquid are distributed across the length of the vessel. Feed inlet distributors however, can be expensive, occupy much space, be difficult to install/remove, and/or lack effectiveness.

The feed inlet piping configuration and the feed momentum ($\rho V^2$) are also important factors when designing to ensure good vapor distribution and minimal liquid droplet shattering. The location of the feed inlet piping configuration on the vessel head vs. the vessel top, for example, can substantially reduce plant facility costs when the elevation of associated heat exchanger/piperack structures can be lowered. The addition of feed inlet distributor options that are suitable with a feed inlet piping configuration on the vessel head therefore, have significant value. The feed inlet distributor options are however, particularly limited due to the constraints described hereinabove.

BRIEF DESCRIPTION OF THE DRAWINGS

The present disclosure is described with reference to the accompanying drawings, in which like elements are referenced with like reference numbers, and in which.

DETAILED DESCRIPTION OF THE ILLUSTRATIVE EMBODIMENTS

The subject matter of the present disclosure is described with specificity, however, the description itself is not intended to limit the scope of the disclosure. The subject matter thus, might also be embodied in other ways, to include different structures, steps and/or combinations similar to and/or fewer than those described herein, in conjunction with other present or future technologies. Although the term "step" may be used herein to describe different elements of methods employed, the term should not be interpreted as implying any particular order among or between various steps herein disclosed unless otherwise expressly limited by the description to a particular order. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures and dimensions described herein are only exemplary and are not intended to assert or imply any limitation with regard to the environment, architecture, design, or process in which different embodiments may be implemented.

The systems and methods disclosed herein thus, overcome the prior art disadvantages associated with conventional feed inlet distributors and associated feed inlet piping configurations for horizontal vessels by using a flow-diverger feed inlet distributor comprising multiple pairs of straight-vertical vanes positioned in the vessel adjacent a feed inlet opening at one head/end and/or a vertical, partially perforated, baffle positioned in the vessel adjacent the feed inlet opening. Although the flow-diverger feed inlet distributor and the perforated baffle are described herein for use in a 3-phase separator such as, for example, a reflux drum, they may be employed within any horizontal vessel to achieve similar results.

In one embodiment, the present disclosure includes a horizontal vessel for separating a vapor and a liquid, which comprises: i) a feed inlet opening at one end of the vessel representing a head of the vessel; and ii) a feed inlet distributor positioned in the vessel adjacent the feed inlet opening, the feed inlet distributor comprising multiple pairs of straight vanes and a baseplate attached to the inside of the vessel just below the feed inlet opening for supporting the multiple pairs of straight vanes; wherein each vane in a pair is positioned opposite another vane in the pair relative to an axis of the feed inlet opening; each vane including a first end nearest the feed inlet opening and extends from the first end radially away from the axis of the feed inlet opening to a second end; and each shortest distance from each first end of each vane of the multiple pairs of straight vanes to a vertical plane perpendicularly intersecting the axis of the feed inlet opening is equal.

In another embodiment, the present disclosure includes A method for separating a vapor and a liquid in a horizontal vessel, which comprises: i) feeding a fluid comprising the vapor and the liquid through a feed inlet opening at one end of the vessel representing a head of the vessel; ii) feeding the fluid through a feed inlet distributor positioned in the vessel adjacent the feed inlet opening to separate a portion of the vapor from the liquid, the feed inlet distributor comprising a pair of straight vanes; and iii) blocking a portion of the liquid separated from the portion of the vapor with a partially perforated baffle positioned in the vessel adjacent the feed inlet distributor.

Figure 1:
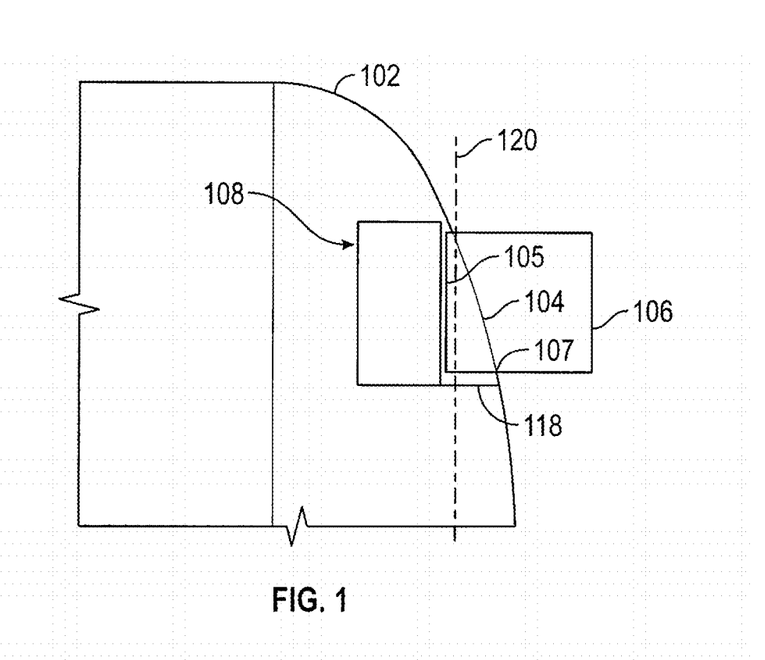
FIG. 1 is a partial side view of a 3-phase separator illustrating a flow-diverger feed inlet distributor comprising multiple pairs of straight-vertical vanes positioned in the separator adjacent a feed inlet opening at one head/end.
Figure 2:
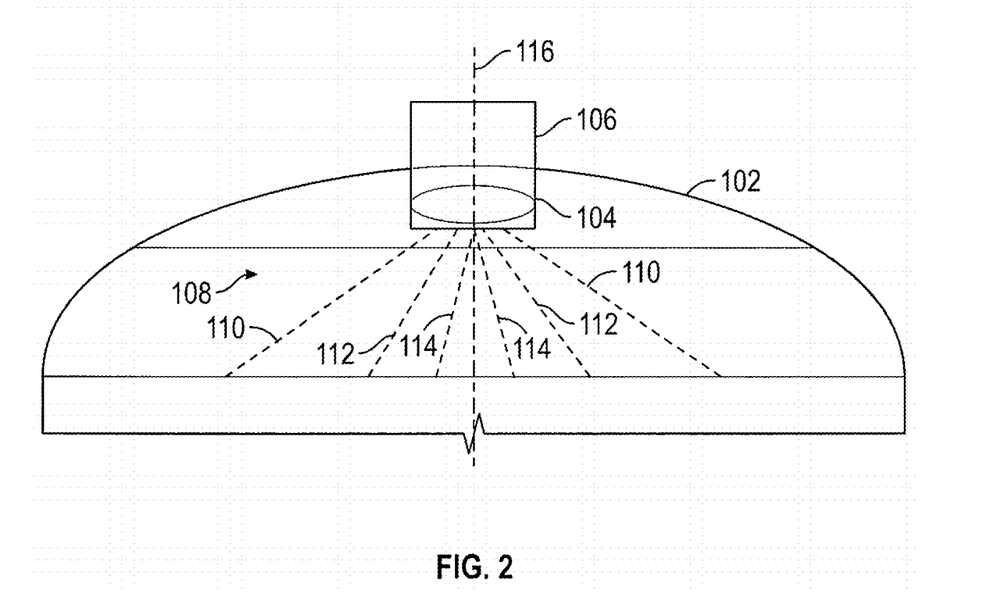
FIG. 2 is a plan view of the flow-diverger feed inlet distributor illustrated in FIG. 1.

Referring now to FIGS. 1-2, a 3-phase separator 102 is illustrated. The 3-phase separator 102 is a horizontal vessel such as, for example, a reflux drum. The separator 102 includes a feed inlet opening 104 at one head/end and feed inlet piping 106 extending therethrough. The feed inlet piping 106 may extend further away from the separator in a manner that is straight or forms an elbow, depending on the structural constraints. A flow-diverger feed inlet distributor 108 is positioned in the separator 102 adjacent the feed inlet opening 104. The flow-diverger feed inlet distributor 108 comprises multiple pairs of straight-vertical vanes (110,112, 114) wherein each vane in a pair is positioned opposite another vane in the pair relative to an axis 116 of the feed inlet opening 104. Each vane includes a first end nearest the feed inlet opening 104 and extends from the first end radially away from the axis 116 to a second end. Each vane also includes a top and a bottom, wherein the top of each vane extends vertically at least two inches above a top 105 of the feed inlet opening 104 and the bottom of each vane extends vertically at least two inches below a bottom 107 of the feed inlet opening 104. The shortest distance from each first end of each vane to a vertical plane 120 perpendicularly intersecting the feed inlet opening 104 is preferably, the same. Likewise, the shortest distance from each second end of each vane to the vertical plane 120 perpendicularly intersecting the feed inlet opening 104 is preferably, the same. Each pair of vanes preferably forms the same angle between the vane and the axis 116. The flow-diverger feed inlet distributor 108 also includes a base plate 118 attached to the inside of the separator 102 just below the feed inlet opening 104 for supporting the multiple pairs of straight-vertical vanes (110, 112,114). The base plate 118 thus, extends from where it is attached to the separator 102 to at least the second end of each vane. The preferred number of pairs of vanes, their spacing, shape and dimensions may be adjusted depending on the application and fluid properties. For example, the vanes could be curvilinear.

Figure 3:
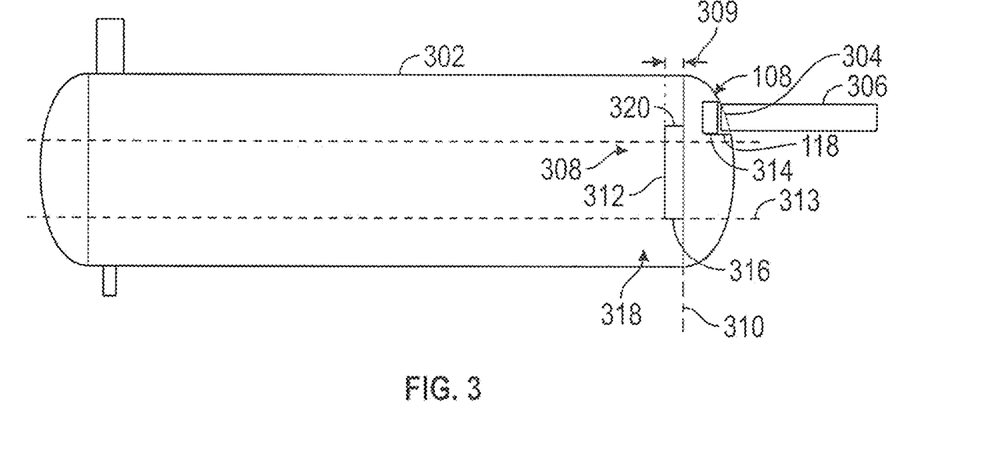
FIG. 3 is a side view of a 3-phase separator illustrating the flow-diverger feed inlet distributor in FIG. 1 and a vertical, partially perforated, baffle positioned in the 3-phase separator adjacent the flow-diverger feed inlet distributor.

Referring now to FIG. 3, a 3-phase separator 302 is illustrated with the flow-diverger feed inlet distributor 108 described in reference to FIGS. 1-2. The separator 302 includes a feed inlet opening 304 at one head/end and feed inlet piping 306 extending therethrough. A vertical, partially perforated, baffle 308 is positioned in the separator 302 adjacent the flow-diverger feed inlet distributor 108 to help calm the liquid prior to its entry into the liquid/liquid separation region. The perforated baffle 308 is attached to the separator 302 above a separator low liquid level 313 at a distance 309 that is preferably no greater than 18 inches downstream from a separator tangent line 310. The perforated baffle 308 includes a solid plate 312 that preferably extends vertically from the separator low liquid level 313 to approximately 6 inches above the bottom 314 of the flow-diverger feed inlet distributor 108. The solid plate 312 includes a bottom horizontal ledge 316 (to help mitigate channeling of liquid exiting under the perforated baffle 308 through an underflow area 318) and a top horizontal ledge 320 (to help mitigate uplift/channeling of liquid through the perforated baffle 308 above the solid plate 312). The top horizontal ledge 320 and the bottom horizontal ledge 316 preferably extend about 6 inches toward the flow-diverger feed inlet distributor 108. Thus, the top horizontal ledge 320 is used to enhance the vapor distribution through the perforated baffle 308 above the solid plate 312. The preferred dimensions of the perforated baffle 308 and its position relative to the flow-diverger feed inlet distributor 108 may be adjusted depending on the application and fluid properties.

Depending on process separation requirements, flow-diverger feed inlet distributor 108 can be used with or without the perforated baffle 308. Likewise, the perforated baffle 308 can be used with or without the flow-diverger feed inlet distributor 108, depending on process separation requirements.

Figure 12:
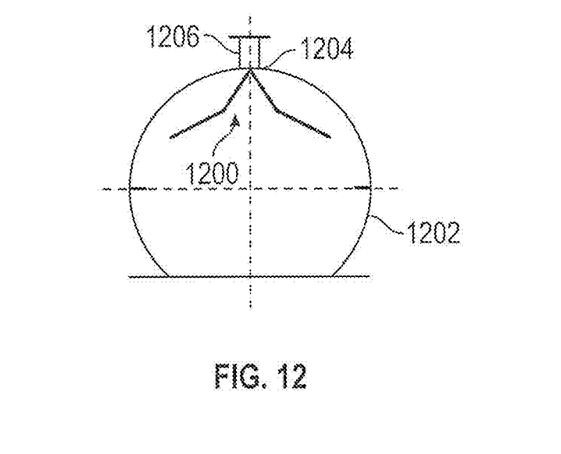
FIG. 12 is an end view of a 3-phase separator illustrating a feed inlet distributor comprising a V-Baffle positioned in the separator adjacent a feed inlet opening at the top of the separator near one head/end.

CFD Modeling Conditions and Cases:

Computational Fluid Dynamic (CFD) modeling was used to test the design of the flow-diverger feed inlet distributor and the perforated baffle illustrated in FIG. 3 (Cases 1-2) and the design of a conventional V-Baffle feed inlet distributor illustrated in FIG. 12 (Cases 3-4). The following dimensions were used for the 3-phase separator in each case: 13.5 ft diameter and 42 ft length (tangent-to-tangent), with 2:1 semi-elliptical heads. The fluid properties (at the feed inlet opening) used in the CFD modeling are shown in Table 1 below. To simplify the modeling, the fluid was treated as two-phase (water mass was included as hydrocarbon liquid mass). Further, the CFD modeling assumed all of the liquid in the feed inlet piping consisted of 100 micron liquid droplets, with no accounting for droplet shattering.

TABLE 1

| Properties | Vapor | HC Liquid | Water |
|---|---|---|---|
| Mass Flow, lb/hr | 80,000 | 250,000 | 105,000 |
| Pressure, psig | | 3 | |
| Temperature, deg F. | | 100 | |
| Density $\rho$, lb/ft3 | 0.104 | 45.1 | 62.3 |
| Nozzle Momentum $\rho v^2$, lb/ft · s$^2$ | 3000 (in 24" diam)/1200 (in 30" diam) | | |
| Viscosity, cP | 0.010 | 0.454 | 0.68 |

Figure 4:
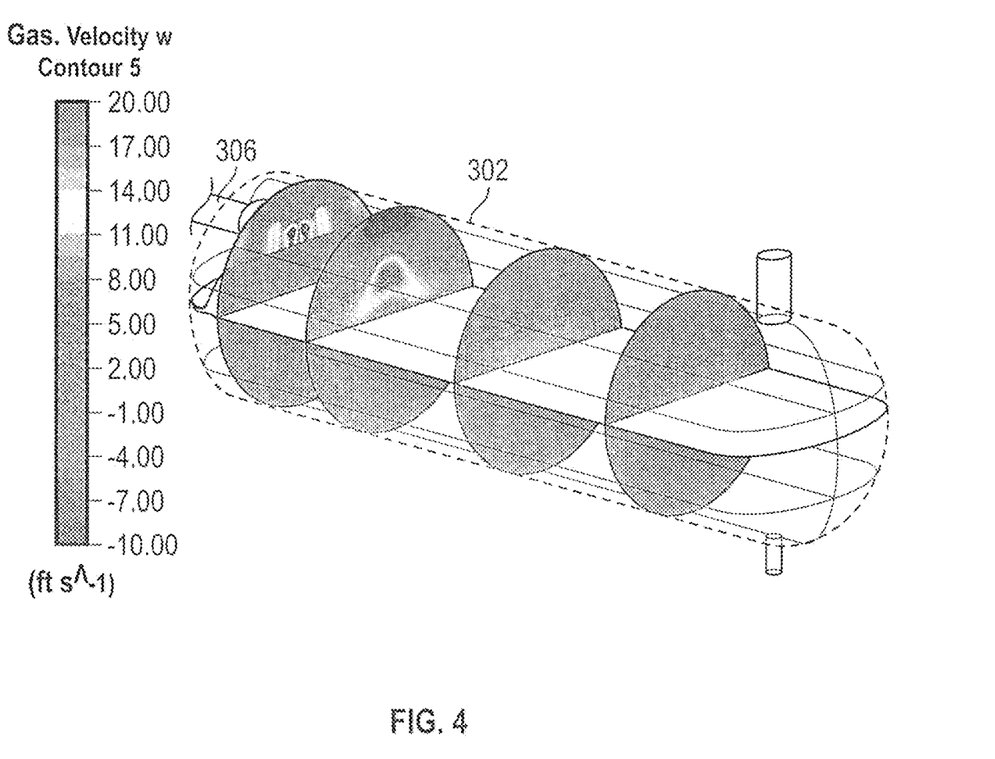
FIG. 4 is a vapor velocity profile for the 3-phase separator in FIG. 3 with a straight feed inlet piping configuration illustrating the vapor distribution exiting the perforated baffle and at 25%, 50%, and 75% of the separator length.
Figure 5:
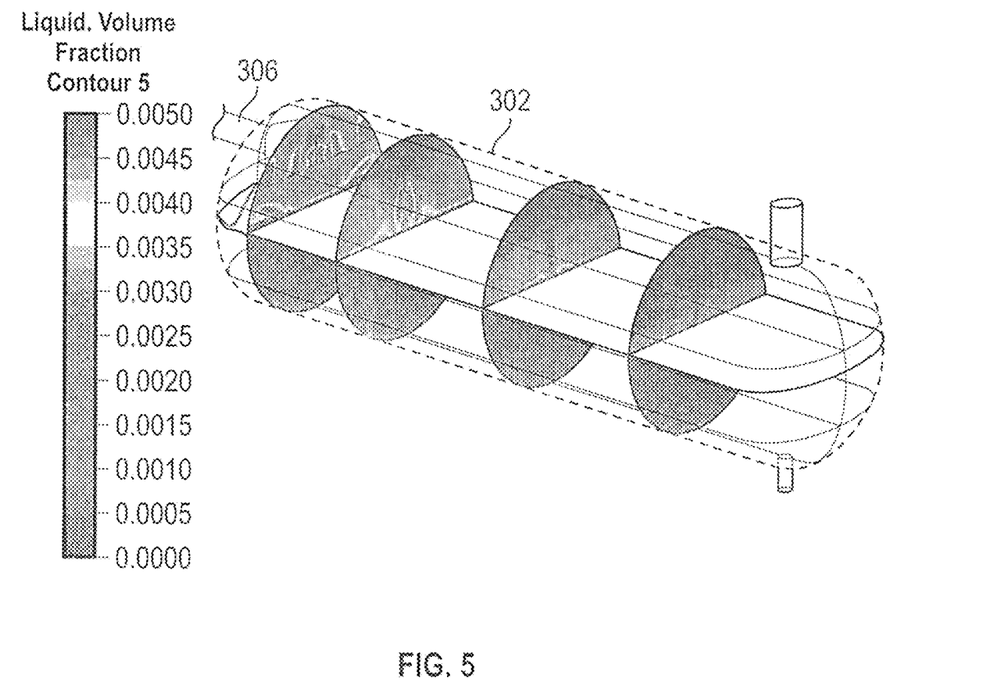
FIG. 5 is a liquid volume fraction profile for the 3-phase separator in FIG. 3 with a straight feed inlet piping configuration illustrating the liquid distribution exiting the perforated baffle and at 25%, 50%, and 75% of the separator length.
Figure 6:
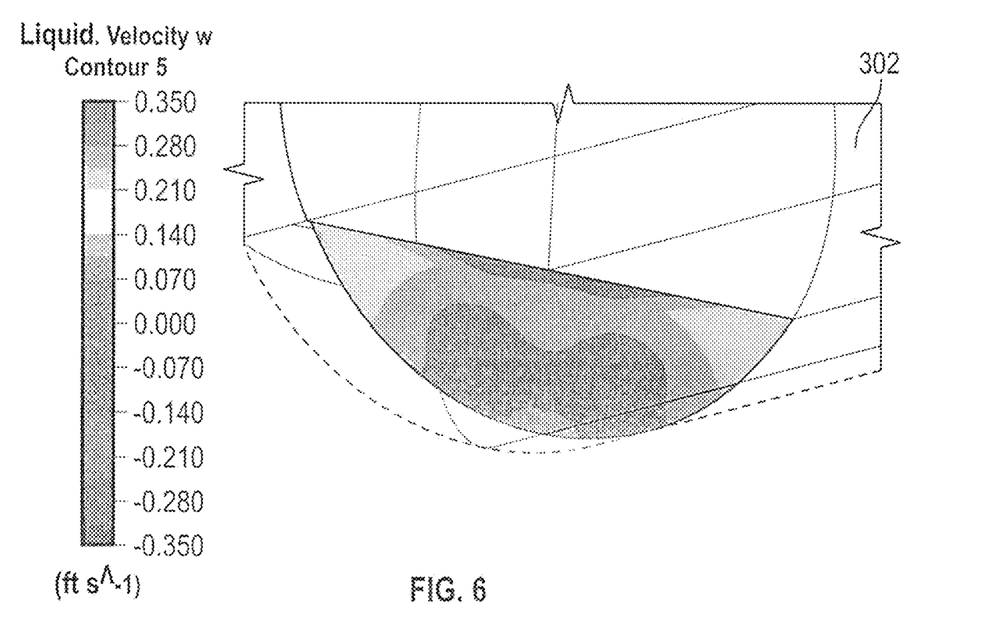
FIG. 6 is a liquid velocity profile for the 3-phase separator in FIG. 3 with a straight feed inlet piping configuration illustrating the liquid pool distribution exiting under the perforated baffle through an underflow area.
Figure 7:
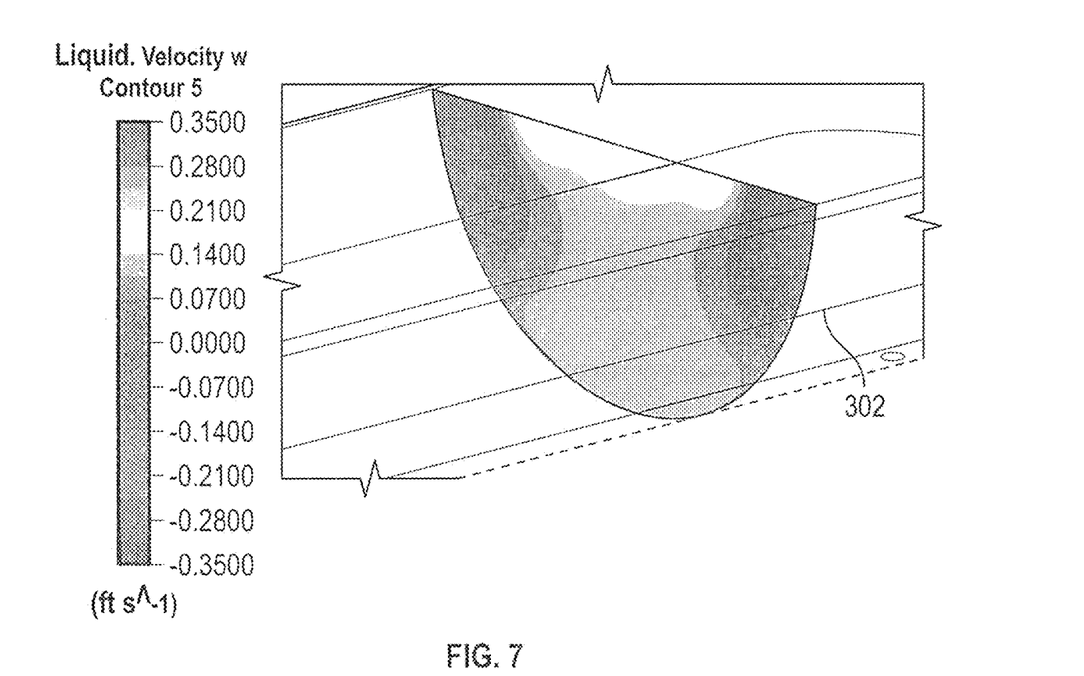
FIG. 7 is a liquid velocity profile for the 3-phase separator in FIG. 3 with a straight feed inlet piping configuration illustrating the liquid pool distribution after exiting the underflow area at 75% of the separator length.

Case 1 Flow-Diverger with Straight Feed Inlet Piping:

A mist flow regime was assumed for the CFD modeling with a straight feed inlet piping configuration and a 24-inch diameter feed inlet opening at one head/end of the separator. FIG. 4 is a vapor velocity profile for the 3-phase separator in FIG. 3, which illustrates the vapor distribution exiting the perforated baffle and at 25%, 50%, and 75% of the separator length. FIG. 5 is a liquid volume fraction profile for the 3-phase separator in FIG. 3, which illustrates the liquid distribution exiting the perforated baffle and at 25%, 50%, and 75% of the separator length. The liquid volume fraction profile in FIG. 5 illustrates how liquid droplets are carried by the vapor until separation due to gravity occurs. FIG. 6 is a liquid velocity profile for the 3-phase separator in FIG. 3, which illustrates the liquid pool distribution exiting under the perforated baffle through the underflow area. And FIG. 7 is a liquid velocity profile for the 3-phase separator in FIG. 3, which illustrates the liquid pool distribution after exiting the underflow area at 75% of the separator length.

Figure 8:
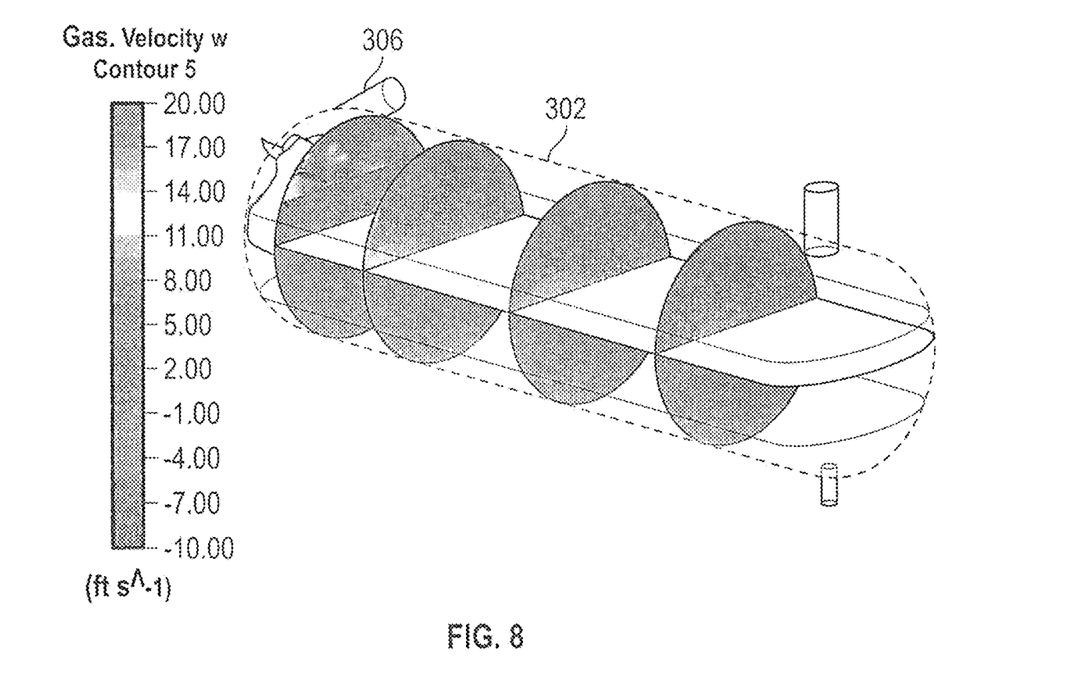
FIG. 8 is a vapor velocity profile for the 3-phase separator in FIG. 3 with an elbow feed inlet piping configuration illustrating the vapor distribution exiting the perforated baffle and at 25%, 50%, and 75% of the separator length.
Figure 9:
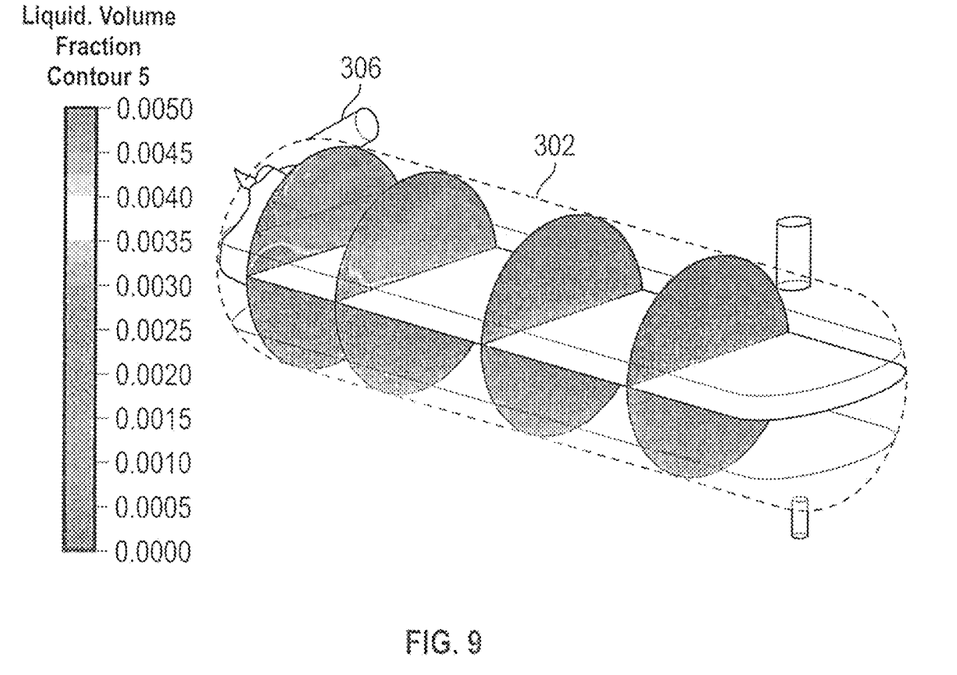
FIG. 9 is a liquid volume fraction profile for the 3-phase separator in FIG. 3 with an elbow feed inlet piping configuration illustrating the liquid distribution exiting the perforated baffle and at 25%, 50%, and 75% of the separator length.
Figure 10:
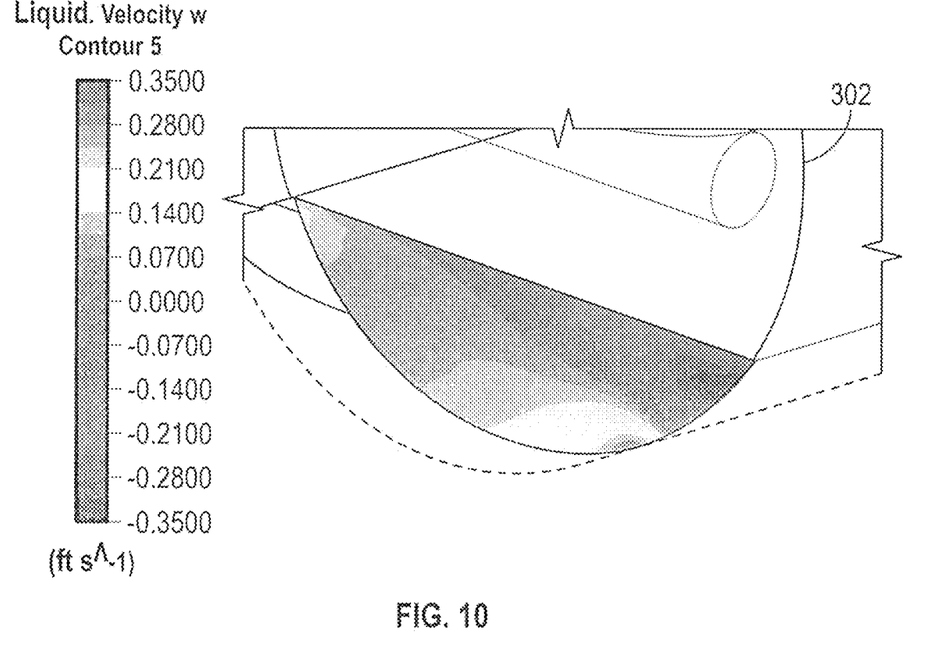
FIG. 10 is a liquid velocity profile for the 3-phase separator in FIG. 3 with an elbow feed inlet piping configuration illustrating the liquid pool distribution exiting under the perforated baffle through the underflow area.
Figure 11:
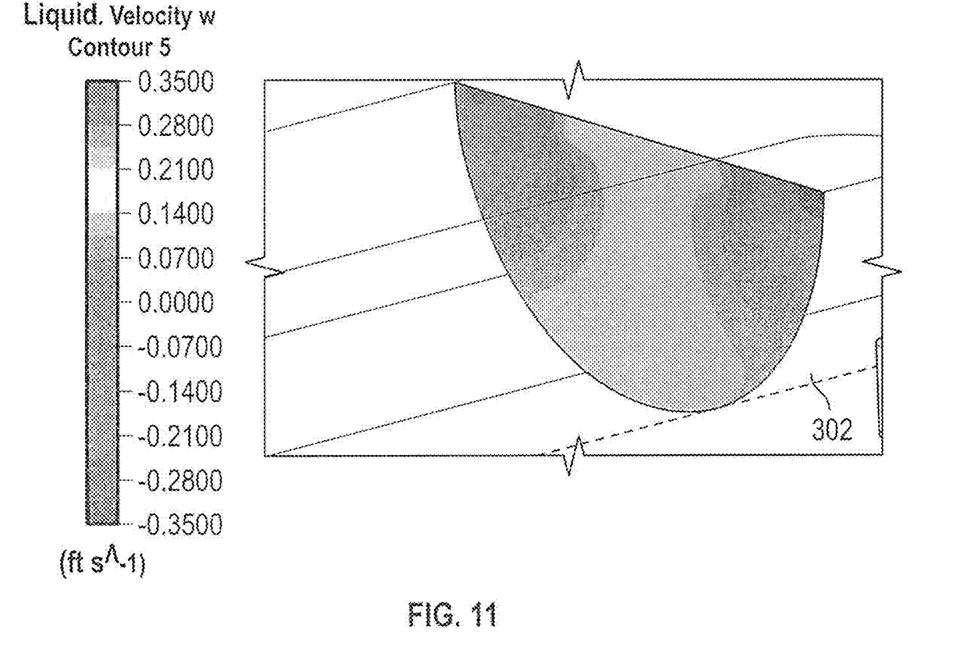
FIG. 11 is a liquid velocity profile for the 3-phase separator in FIG. 3 with an elbow feed inlet piping configuration illustrating the liquid pool distribution after exiting the underflow area at 75% of the separator length.

Case 2 Flow-Diverger with Elbow Feed Inlet Piping:

A mist flow regime was assumed for the CFD modeling with an elbow feed inlet piping configuration, to help assess the impact on flow distribution with a non-ideal feed inlet piping configuration, and a 24-inch diameter feed inlet opening at one head/end of the separator. Due to momentum effects, higher velocity is seen on one side of the separator, and the flow profiles are less symmetrical, but the CFD results again showed reasonably good vapor and liquid distribution. FIG. 8 is a vapor velocity profile for the 3-phase separator in FIG. 3, which illustrates the vapor distribution exiting the perforated baffle and at 25%, 50%, and 75% of the separator length. FIG. 9 is a liquid volume fraction profile for the 3-phase separator in FIG. 3, which illustrates the liquid distribution exiting the perforated baffle and at 25%, 50%, and 75% of the separator length. FIG. 10 is a liquid velocity profile for the 3-phase separator in FIG. 3, which illustrates the liquid pool distribution exiting under the perforated baffle through the underflow area. And FIG. 11 is a liquid velocity profile for the 3-phase separator in FIG. 3, which illustrates the liquid pool distribution after exiting the underflow area at 75% of the separator length.

Figure 13:
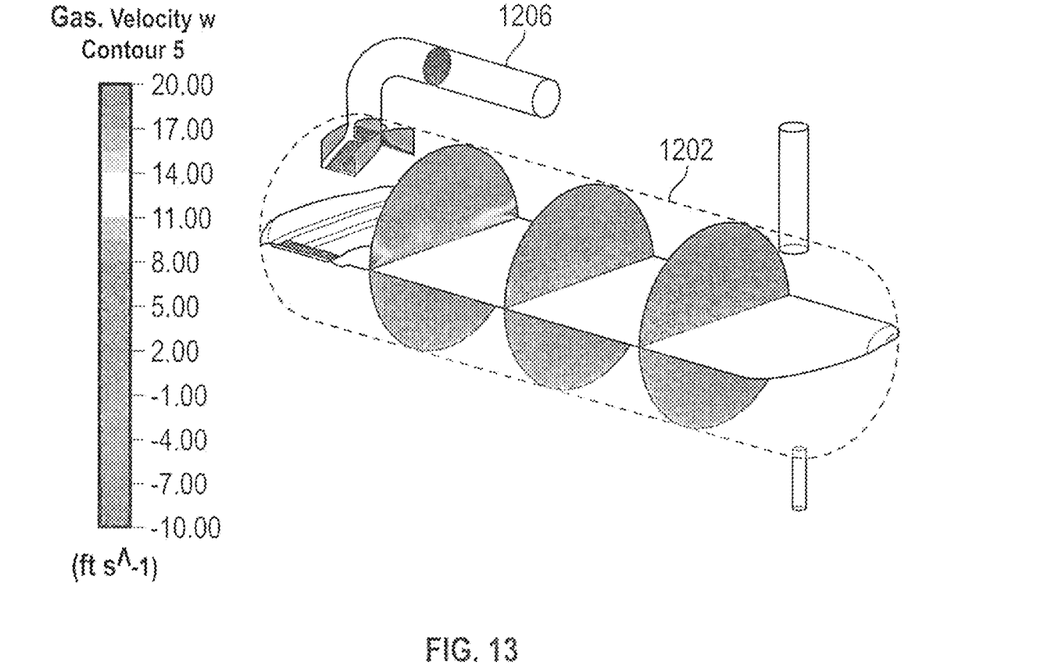
FIG. 13 is a vapor velocity profile for the 3-phase separator in FIG. 12 with a parallel feed inlet piping configuration illustrating the vapor distribution at 25%, 50%, and 75% of the separator length.
Figure 14:
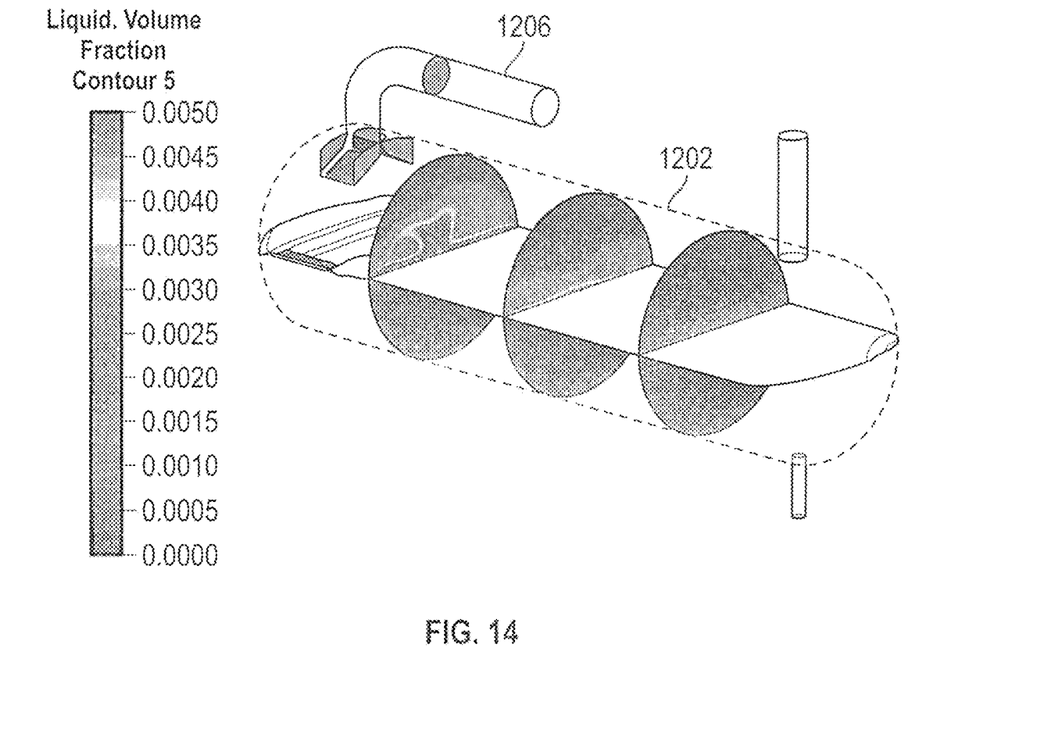
FIG. 14 is a liquid volume fraction profile for the 3-phase separator in FIG. 12 with a parallel feed inlet piping configuration illustrating the liquid distribution at 25%, 50%, and 75% of the separator length.
Figure 15:
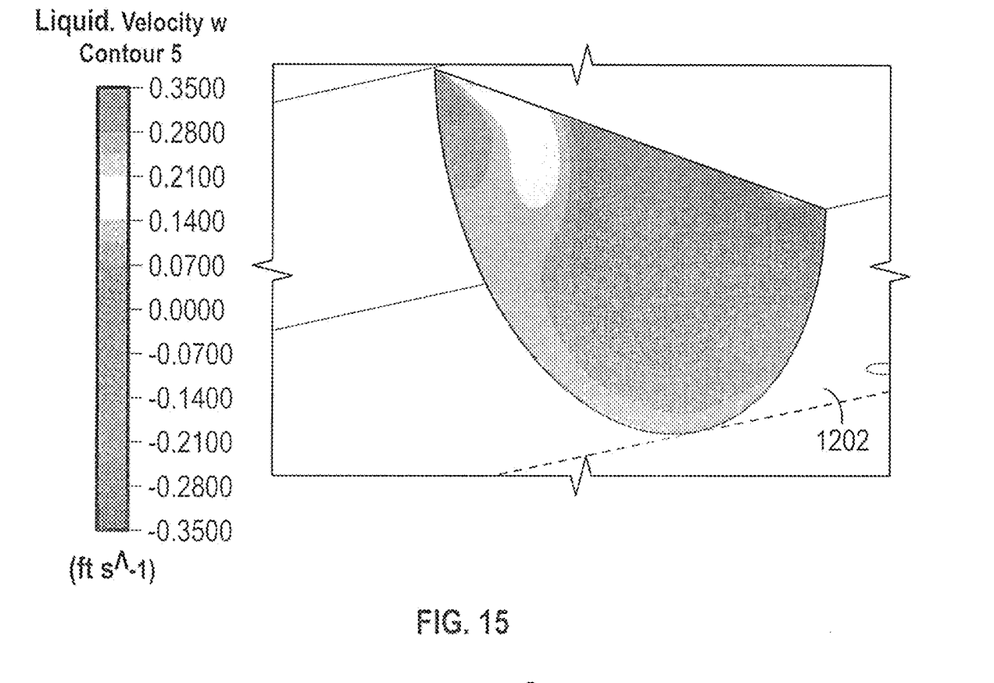
FIG. 15 is a liquid velocity profile for the 3-phase separator in FIG. 12 with a parallel feed inlet piping configuration illustrating the liquid pool distribution at 75% of the separator length.

Case 3 V-Baffle with Parallel Feed Inlet Piping:

A mist flow regime was assumed for the CFD modeling to test a conventional V-Baffle feed inlet distributor with the same 3-phase separator dimensions and fluid properties used in Cases 1-2. As illustrated by an end view of the separator 1202 in FIG. 12, a conventional V-Baffle feed inlet distributor 1200 was positioned in the separator 1202 adjacent a 30-inch diameter feed inlet opening 1204 at the top of the separator 1202 near one head/end. The feed inlet piping 1206 connected to the separator 1202 at the feed inlet opening 1204 is a parallel configuration for this case. The V-Baffle feed inlet distributor 1200 is 33-inches. FIG. 13 is a vapor velocity profile for the 3-phase separator in FIG. 12, which illustrates the vapor distribution at 25%, 50%, and 75% of the separator length. FIG. 14 is a liquid volume fraction profile for the 3-phase separator in FIG. 12, which illustrates the liquid distribution at 25%, 50%, and 75% of the separator length. FIG. 15 shows the liquid velocity profile at 75% of the vessel length. And FIG. 15 is a liquid velocity profile for the 3-phase separator in FIG. 12, which illustrates the liquid pool distribution at 75% of the separator length.

Figure 16:
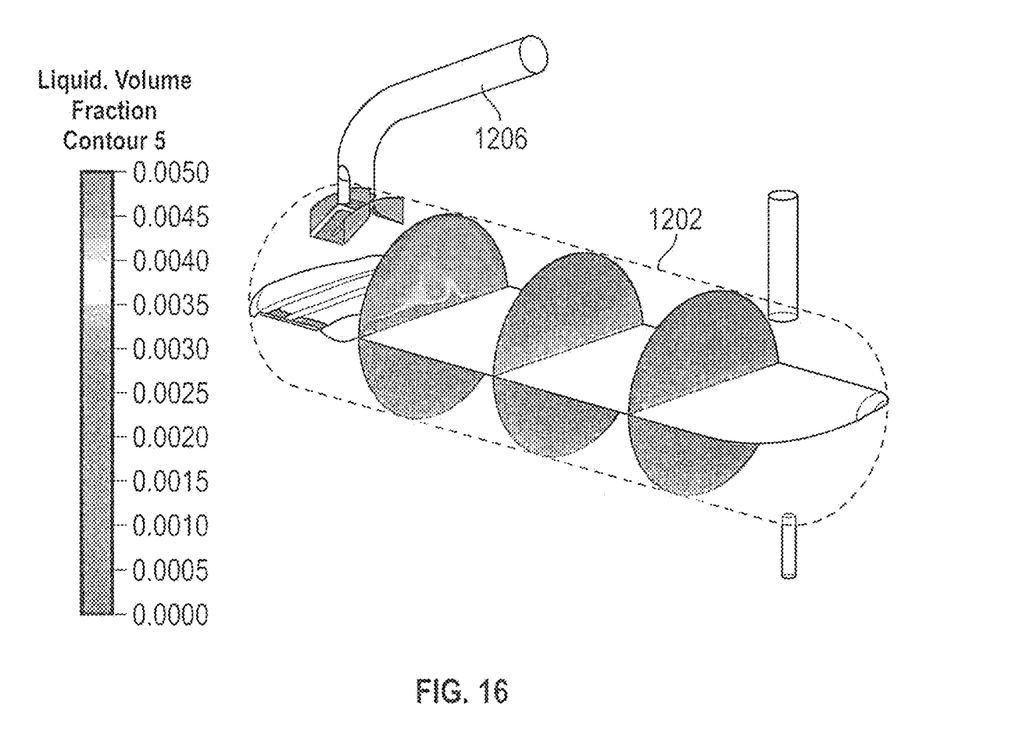
FIG. 16 is a liquid volume fraction profile for the 3-phase separator in FIG. 12 with a perpendicular feed inlet piping configuration illustrating the liquid distribution at 25%, 50%, and 75% of the separator length.
Figure 17:
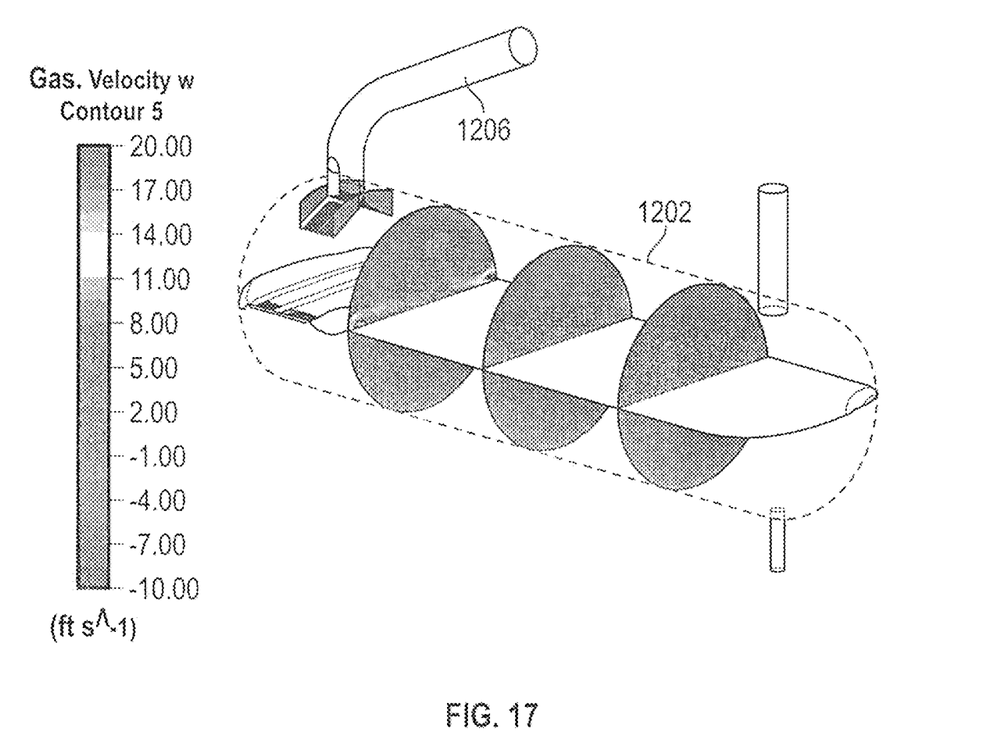
FIG. 17 is a vapor velocity profile for the 3-phase separator in FIG. 12 with a perpendicular feed inlet piping configuration illustrating the vapor distribution at 25%, 50%, and 75% of the separator length.
Figure 18:
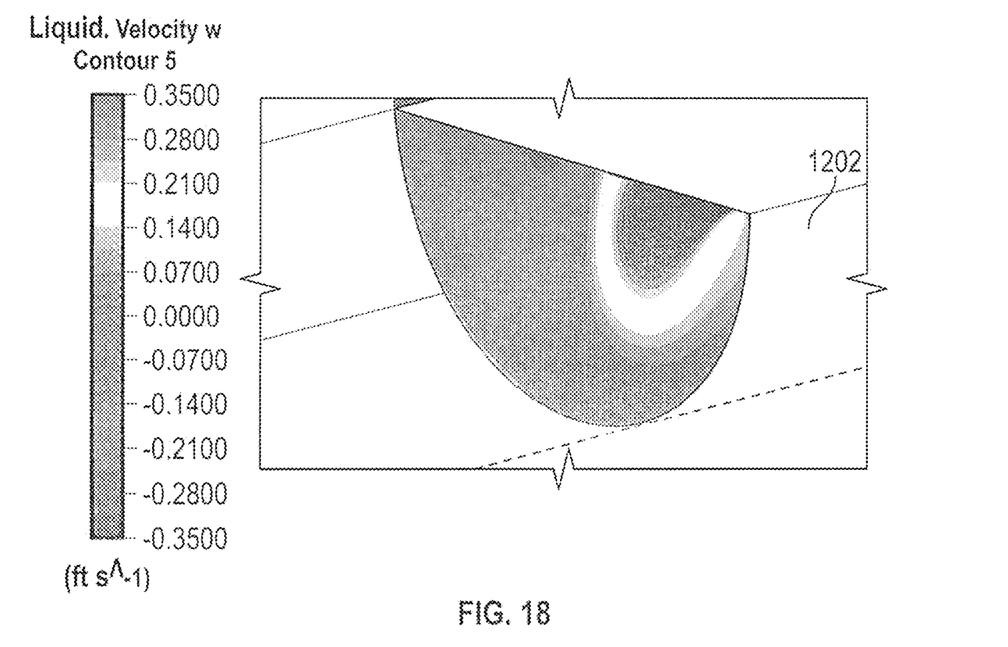
FIG. 18 is a liquid velocity profile for the 3-phase separator in FIG. 12 with a perpendicular feed inlet piping configuration illustrating the liquid pool distribution at 75% of the separator length.

Case 4 V-Baffle with Perpendicular Feed Inlet Piping:

A mist flow regime was assumed for the CFD modeling to test the conventional V-Baffle feed inlet distributor in FIG. 12 with the same 3-phase separator dimensions and fluid properties used in Cases 1-2. The feed inlet piping configuration is an elbow oriented 90 degrees to the separator centerline (perpendicular) to assess the impact on flow distribution with a non-ideal feed inlet piping configuration. FIG. 16 is a liquid volume fraction profile for the 3-phase separator in FIG. 12, which illustrates the liquid distribution at 25%, 50%, and 75% of the separator length. FIG. 17 is a vapor velocity profile for the 3-phase separator in FIG. 12, which illustrates the vapor distribution at 25%, 50%, and 75% of the separator length. And FIG. 18 is a liquid velocity profile for the 3-phase separator in FIG. 12, which illustrates the liquid pool distribution at 75% of the separator length. Due to momentum effects, more liquid enters on one side of the vessel, and the flow profiles are less symmetrical. Although CFD results show reasonably good vapor distribution, the liquid distribution appears to be substantially worse compared to results for Cases 1-3.

CFD Modeling Results:

The vapor velocity and liquid volume fraction profiles in the separator vapor space provide a good indication of vapor/liquid settling effectiveness. The liquid velocity profile in the separator liquid pool provides a good indication of liquid/liquid settling effectiveness.

A comparison of the CFD modeling results for Cases 1 and 3 demonstrate the flow-diverger feed inlet distributor and the perforated baffle provided slightly better vapor distribution and vapor/liquid separation than the V-Baffle feed inlet distributor, even though its feed inlet opening $\rho V2$ value of 3000 lb/ft.s2 was substantially higher than the feed inlet opening $\rho V2$ value of 1200 lb/ft.s2 for the V-Baffle feed inlet distributor. Liquid distribution appears comparable. The CFD modeling results for Case 2 with the (nonideal) elbow feed inlet piping configuration showed only a small drop-off in performance when compared to Case 1 modeling results. The CFD modeling results for Case 4 with the (nonideal) perpendicular feed inlet piping configuration showed a significant drop-off in performance when compared to Case 3 modeling results. Unfortunately, the Case 4 feed inlet piping configuration may be more commonly employed in industry due to a simpler piping arrangement than required for the Case 3 feed inlet piping configuration.

In reality, the flow regime and the propensity for shattering of liquid droplets can further impact the phase separations. More shattering of droplets is expected when liquid impingement occurs at high velocities against flatter surfaces, and/or with sharp turns and asymmetrical flow, which may be more common with V-Baffle feed inlet distributors.

The CFD modeling results demonstrate that the flow-diverger feed inlet distributor performed well at distributing vapor in the separator when positioned adjacent a feed inlet opening at one head/end of the separator. The CFD modeling results also demonstrate that a perforated baffle positioned in the separator adjacent the flow-diverger feed inlet distributor further improves the vapor and liquid distribution—even at high vapor/liquid velocities at the feed inlet opening. In sum, the CFD modeling results demonstrate the flow-diverger feed inlet distributor: i) can be used effectively with any feed inlet opening in a horizontal vessel at one head/end thus, facilitating cost reduction opportunities for associated equipment structures; ii) is equal to or better than a V-Baffle feed inlet distributor (positioned adjacent a feed inlet opening at the top of the vessel) in its effectiveness to distribute vapor and liquid throughout the vessel; iii) can be made for bolted assembly to facilitate installation/removal; and iv) would not be inordinately complicated or expensive to fabricate.

Figure 19:
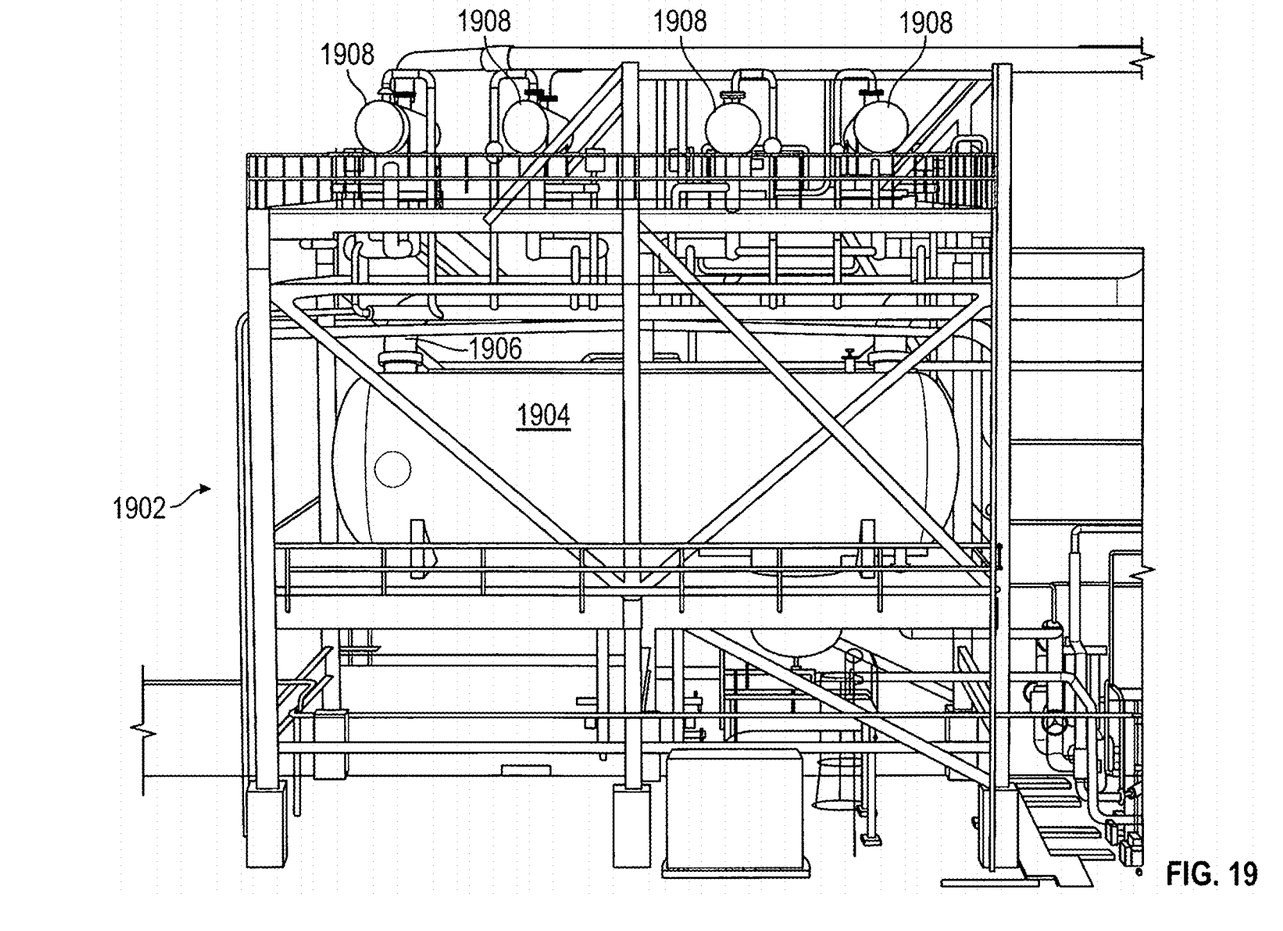
FIG. 19 is an elevation view of a process unit illustrating a conventional layout of a reflux drum with a perpendicular feed inlet piping configuration and the V-Baffle feed inlet distributor in FIG. 12, trim condensers and related support structure/equipment.

Plant Design Case Study:

In FIG. 19, an elevation view of a process unit 1902 illustrates a conventional layout of a reflux drum 1904 with a perpendicular feed inlet piping configuration 1906 and the V-Baffle feed inlet distributor in FIG. 12 positioned in the reflux drum 1904 adjacent a 30-inch feed inlet opening at the top of the reflux drum 1904 near one head/end. Trim condensers 1908 and related support structure/equipment are also illustrated. The process unit 1902 in FIG. 19 was adjusted to develop the more efficient process unit 2002 illustrated in FIG. 20.

Figure 20:
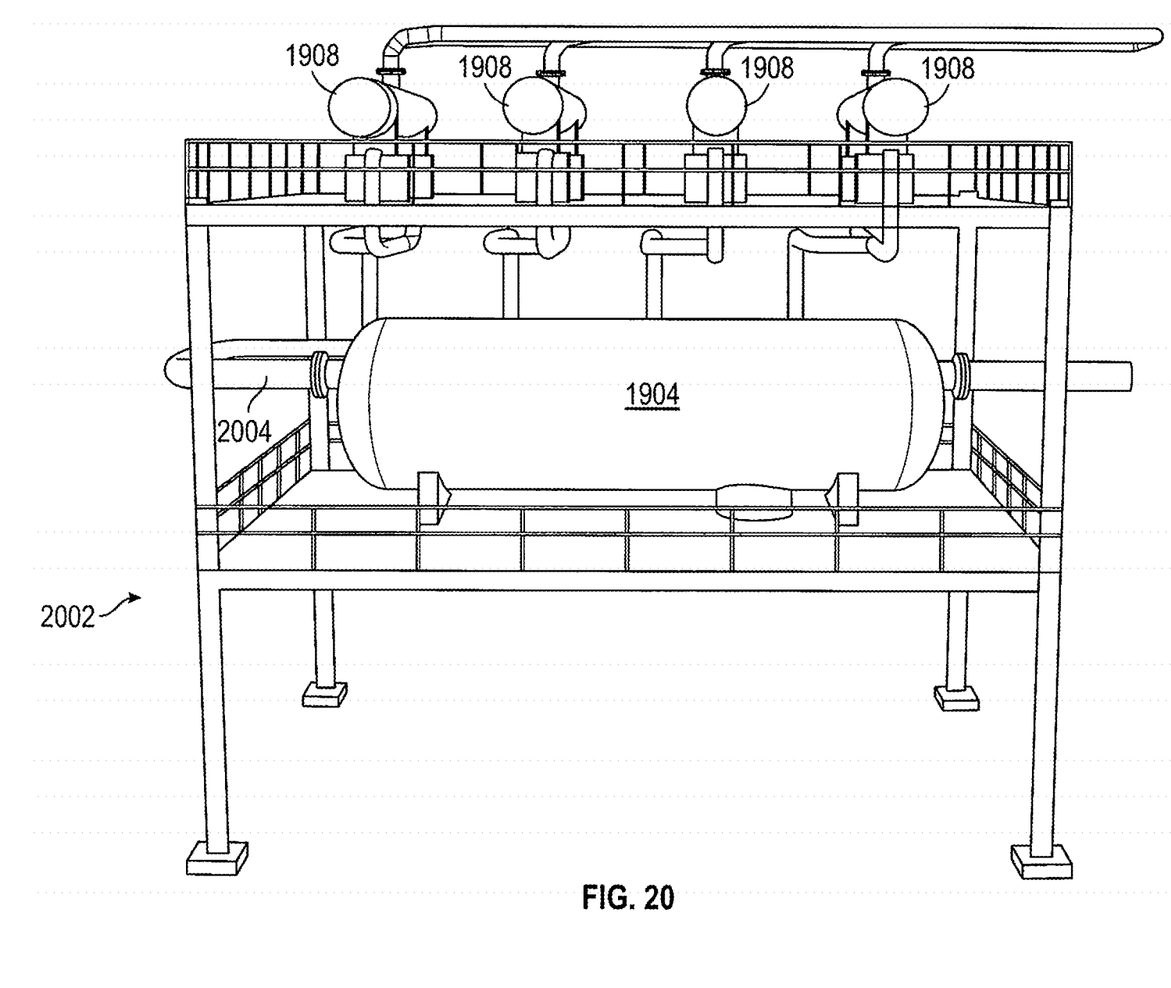
FIG. 20 is an elevation view of a process unit illustrating an alternative layout of a reflux drum with a straight feed inlet piping configuration and the flow-diverger feed inlet distributor in FIG. 1, trim condensers and related support structure/equipment.

In FIG. 20, the reflux drum 1904 includes a straight feed inlet piping configuration 2004 and the flow-diverger feed inlet distributor in FIG. 1 positioned in the reflux drum 1904 adjacent a 24-inch feed inlet opening at one head/end of the reflux drum 1904. The trim condensers 1908 are located on a platform directly above the reflux drum 1904 and are free-draining into the reflux drum 1904. The elevations of the trim condensers 1908, their platform, and the entire unit piperack (and other air coolers) were thus, reduced by 6 feet. The OOM installed cost for structures and piping was approximated to be reduced by $0.5 million. This saving results from reducing elevations of upstream trim condensers, which free-drain through the drum inlet nozzle and (air-cooled) condensers that free-drain to the trim condensers. The cost reduction could be even more for process unit designs with a more optimal layout that takes better advantage of the 11 foot elevation reduction available for the feed inlet piping between the process unit designs in FIGS. 19 and 20.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A horizontal vessel for separating a vapor and a liquid, which comprises: a feed inlet opening at one end of the vessel representing a head of the vessel; and a feed inlet distributor positioned in the vessel adjacent the feed inlet opening, the feed inlet distributor comprising multiple pairs of straight vanes and a baseplate attached to the inside of the vessel just below the feed inlet opening for supporting the multiple pairs of straight vanes; wherein each vane in a pair is positioned opposite another vane in the pair relative to an axis of the feed inlet opening; each vane including a first end nearest the feed inlet opening and extends from the first end radially away from the axis of the feed inlet opening to a second end; and a shortest distance from each first end of each vane of the multiple pairs of straight vanes to a vertical plane perpendicularly intersecting the axis of the feed inlet opening is equal.

2. The horizontal vessel of claim 1, wherein the multiple pairs of straight vanes include two pairs of straight vanes that are substantially vertical relative to the horizontal vessel.

3. The horizontal vessel of claim 1, wherein each vane includes a top extending vertically at least about two inches above a top of the feed inlet opening and a bottom extending vertically at least about two inches below a bottom of the feed inlet opening.

4. The horizontal vessel of claim 1, wherein a shortest distance from each second end of each vane to the vertical plane perpendicularly intersecting the axis of the feed inlet opening is equal.

5. The horizontal vessel of claim 1, wherein an angle between a respective vane in each pair of vanes and the axis of the feed inlet opening is equal.

6. The horizontal vessel of claim 1, wherein the base plate extends to at least the second end of each vane.

7. The horizontal vessel of claim 1, further comprising a partially perforated baffle positioned in the vessel adjacent to the feed inlet distributor.

8. The horizontal vessel of claim 7, wherein the baffle is attached to the vessel above a predetermined vessel low liquid level at a distance that is no greater than about 18 inches downstream from a predetermined vessel tangent line.

9. The horizontal vessel of claim 8, wherein the baffle includes a solid plate that extends vertically from the vessel predetermined low liquid level to about 6 inches above a bottom of the feed inlet distributor.

10. The horizontal vessel of claim 9, wherein the solid plate includes a bottom horizontal ledge and a top horizontal ledge, each ledge extending about 6 inches toward the feed inlet distributor.

11. The horizontal vessel of claim 1, further comprising a feed inlet pipe connected to the feed inlet opening and extending away from the feed inlet opening.

12. The horizontal vessel of claim 5, wherein an angle between a respective vane in a pair of vanes and the axis of the feed inlet opening is not equal to an angle between a respective vane in another pair of vanes and the axis of the feed inlet opening.

\* \* \* \* \*